(12) United States Patent
Johnson et al.

(10) Patent No.: US 6,219,800 B1
(45) Date of Patent: Apr. 17, 2001

(54) FAULT-TOLERANT STORAGE SYSTEM

(75) Inventors: Theodore Johnson; Dennis Shasha, both of New York, NY (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/100,606

(22) Filed: Jun. 19, 1998

(51) Int. Cl.$^7$ .................................................. G06F 11/00
(52) U.S. Cl. .................................................. 714/5; 714/6
(58) Field of Search ........................................ 714/5, 6, 42

(56) References Cited

U.S. PATENT DOCUMENTS

| | | | |
|---|---|---|---|
| 5,634,109 | * | 5/1997 | Chen ........................................ 714/5 |
| 5,864,655 | * | 1/1999 | Dewey ...................................... 714/5 |
| 6,148,368 | * | 11/2000 | DeKoning ............................. 711/113 |

OTHER PUBLICATIONS

Chen et al. "ACM Computing Surveys: RAID High Performance Reliable Secondary Storage" vol. 2, No. 26, Jun. 1994.*

E. Gabber et al., "Data Logging: A Method for Efficient Data Updates in Constantly Active RAIDS," *Fourteenth International Conference on Data Engineering*, IEEE Computer Society, 1998, pp. 144–153.

S. Savage et al., "AFRAID—A Frequently Redundant Array of Independent Disks," *1996 USENIX Technical Conference*, Jan. 22–26, 1996, San Diego, CA., pp. 27–39.

D. Stodolsky et al., "Parity Logging: Overcoming the Small Write Problem in Redundant Disk Arrays," *Proceedings of the Twentieth International Symposium on Computer Architecture*, May 1993, pp. 64–75.

* cited by examiner

*Primary Examiner*—Robert Beausoleil
*Assistant Examiner*—Bryce Bonzo

(57) ABSTRACT

The present invention is a storage system, and method of operation thereof, which provides improved performance over standard RAID-5 without increasing vulnerability to single-disk drive failures. The storage system comprises a processor and a plurality of data storage devices, coupled to the processor, operable to store a plurality of data stripes, each data stripe comprising a plurality of data blocks and a parity block, each data storage device operable to store one data block or the parity block of each data stripe. The storage system stores a dirty stripe bit vector of a data stripe. When an update to a data block in the data stripe is received, an image of the data block as it was when the dirty stripe bit vector was generated is stored. The data block is updated and an image of the updated data block is stored. When a failure of one of the plurality of data storage devices is detected, a bitwise exclusive-OR of the image of the data block as it was when the dirty stripe bit vector was generated and the image of the updated data block to form an intermediate result is generated. The parity block of the data stripe is read and a bitwise exclusive-OR of the intermediate result and the parity block is generated. The generated parity block is written and a parity rebuild is performed on the data stripe using the new parity block.

12 Claims, 8 Drawing Sheets

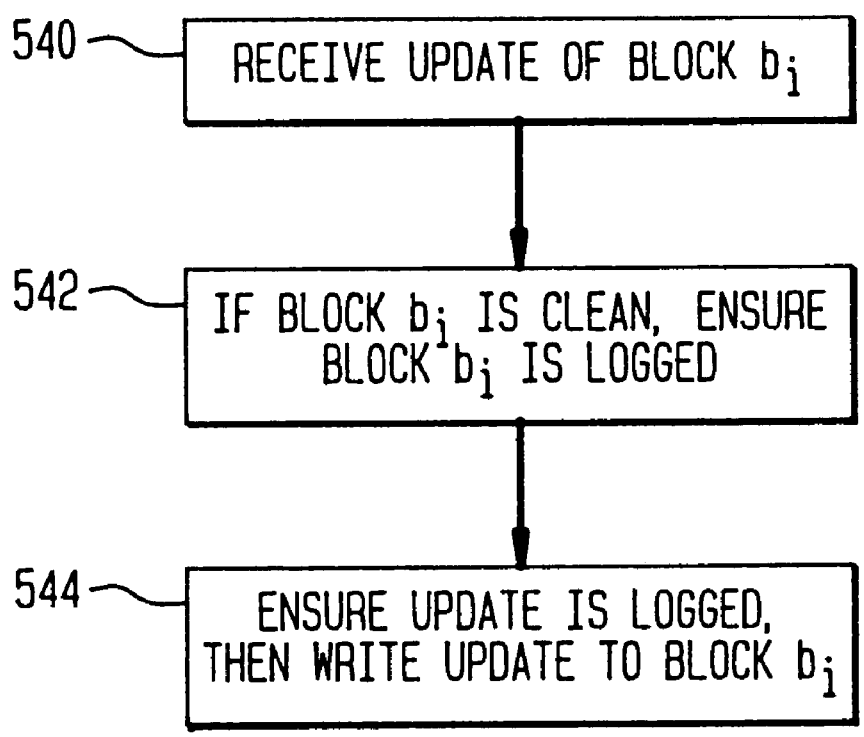

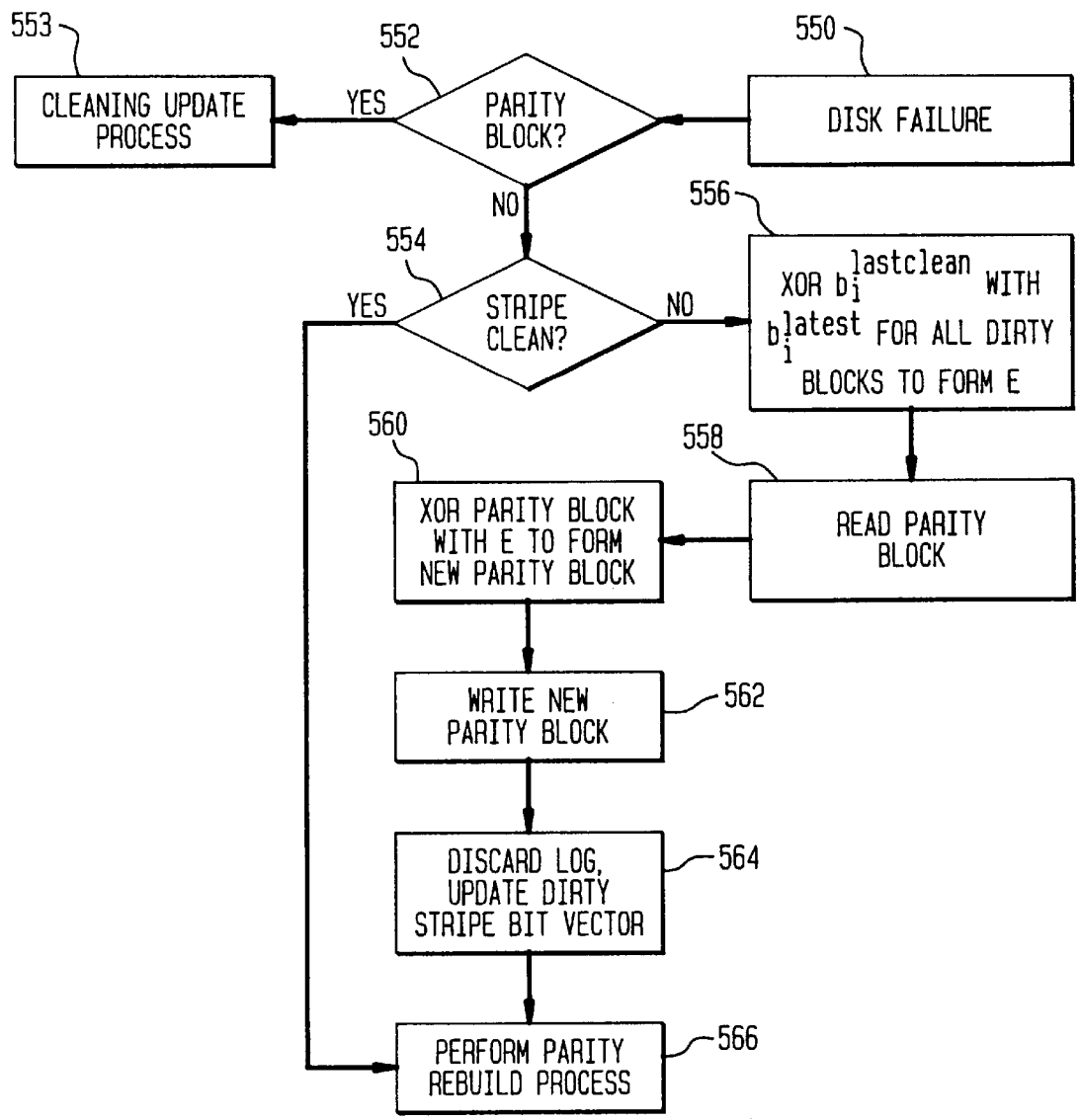

FAULT-TOLERANT STORAGE SYSTEM

FIELD OF THE INVENTION

The present invention relates to fault-tolerant disk storage methods and systems.

BACKGROUND OF THE INVENTION

The RAID-5 standard describes a fault-tolerant architecture for storing data on disk storage devices. A plurality of disk drives are arranged into a storage array. Data is stored in the array in units termed stripes. Each stripe is partitioned into sub-units termed blocks, with one block of each stripe stored on one disk drive in the array. The storage array is protected against single-disk drive failures by assigning one block in each stripe to be the parity block for the stripe. RAID-5 provides excellent performance for large consecutive reads and batch loads, because each block in a stripe may be accessed in parallel with each other block. However, RAID-5 storage arrays have poor performance for the small updates typically found in transaction processing, because the parity block must be updated after even a small update.

Several schemes have been proposed to overcome this performance problem. For example, the scheme proposed by Savage and Wilkes ("AFRAID—A Frequently Redundant Array of Independent Disks", by Stefan Savage and John Wilkes, 1996 USENIX Technical Conference, Jan. 22–26, 1996) provides a greatly improved level of performance for RAID-5 arrays. This scheme defers the update to the parity block to periods in which the disk drive is idle, a situation which occurs frequently. However, this scheme also increases the vulnerability of the array to single disk drive failures, because of the likelihood that recently updated disk blocks will be lost when a disk drive fails.

The scheme proposed by Stodolsky et al. ("Parity Logging—Overcoming the Small Write Problem in Redundant Disk Arrays", by Daniel Stodolsky, Garth Gibson and Mark Holland, *IEEE* 1993, pp. 64–75) generates parity updates and logs them, rather than updating the parity immediately. When the log buffer is full, the parity updates are all written in one large update. This scheme preserves the reliability of the storage array, but only increases performance to the extent that the logging overhead plus the update overhead is less than the other overhead.

While the increased vulnerability of the Savage—Wilkes scheme may be tolerated in some applications, it is not acceptable in other applications, such as databases. A need arises for a technique which provides improved performance over standard RAID-5 without increasing vulnerability to single-disk drive failures.

SUMMARY OF THE INVENTION

The present invention is a storage system, and method of operation thereof, which provides improved performance over standard RAID-5 without increasing vulnerability to single-disk drive failures. The storage system comprises a processor and a plurality of data storage devices, coupled to the processor, operable to store a plurality of data stripes, each data stripe comprising a plurality of data blocks and a parity block, each data storage device operable to store one data block or the parity block of each data stripe. The storage system ensures that a parity-consistent image of a data stripe can be constructed in spite of single disk failures.

When an update to a data block in the data stripe is received, an image is stored of the data block as it was when the current parity-consistent image of the stripe was generated. The data block is updated and an image of the updated data block is stored. When a failure of one of the plurality of data storage devices is detected, the contents of the block on the failed device are generated. The parity block of a non-parity-consistent or dirty stripe is generated by computing a bitwise exclusive-OR of the image of each updated data block as it was when the parity-consistent image was generated, and the current image of each updated data block, to form an intermediate result. The parity block of the data stripe is read and a bitwise exclusive-OR of the intermediate result and the parity block is generated.

The generated parity block is written and a parity rebuild is performed on the data stripe using the new parity block.

BRIEF DESCRIPTION OF THE DRAWINGS

The details of the present invention, both as to its structure and operation, can best be understood by referring to the accompanying drawings, in which like reference numbers and designations refer to like elements.

FIG. 5b is a more detailed block diagram of the storage system of FIG. 5a.

FIG. 5c is a flow diagram of a block updating process, implemented in the storage system of FIG. 5a.

FIG. 5d is a flow diagram of a log-assisted rebuild process, implemented in the system of FIG. 5a.

DETAILED DESCRIPTION OF THE INVENTION

Figure 1:
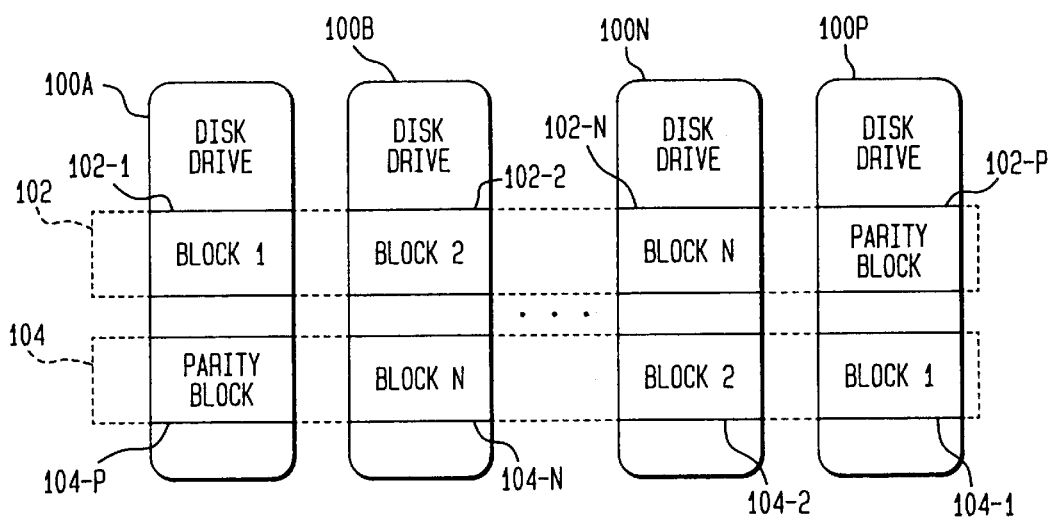
FIG. 1 is a block diagram of an exemplary prior art RAID-5 disk array.

A prior art RAID-5 disk array is shown in FIG. 1. The array includes a plurality of disk drives 100A–P. As shown, stripes of data, such as stripe 102 or stripe 104, are stored across all the disk drives in the array. Each disk drive stores one sub-unit (block) of each stripe. For example, disk drive 100A stores one block from stripe 102, block 102-1, and one block from stripe 104, block 104-P. Within each stripe, one block stores the parity data and the remaining blocks store the actual stored data. For example, in stripe 102, blocks 102-1 to 102-N store the actual data and block 102-P stores the parity data. Likewise, in stripe 104, blocks 104-1 to 104-N store the actual data and block 104-P stores the parity data. As shown, it is not necessary for the parity blocks of all stripes to be stored on the same disk drive, the only requirement is that within each stripe, each block is stored on a different disk drive.

This arrangement provides RAID-5 with complete tolerance to single-disk drive failures. In addition, RAID-5 has excellent performance for large consecutive reads and batch loads, because each block of a stripe can be accessed in parallel. When an entire stripe is updated, as in a large batch load, the parity block must be updated, but the overhead incurred is small compared to the amount of data being written. However, RAID-5 has poor performance for the small updates that are typical of transaction processing, due to the performance costs of maintaining the parity block. When a small update occurs, the parity block must also be updated. The overhead incurred is quite large compared to the amount of data being written.

Figure 2:
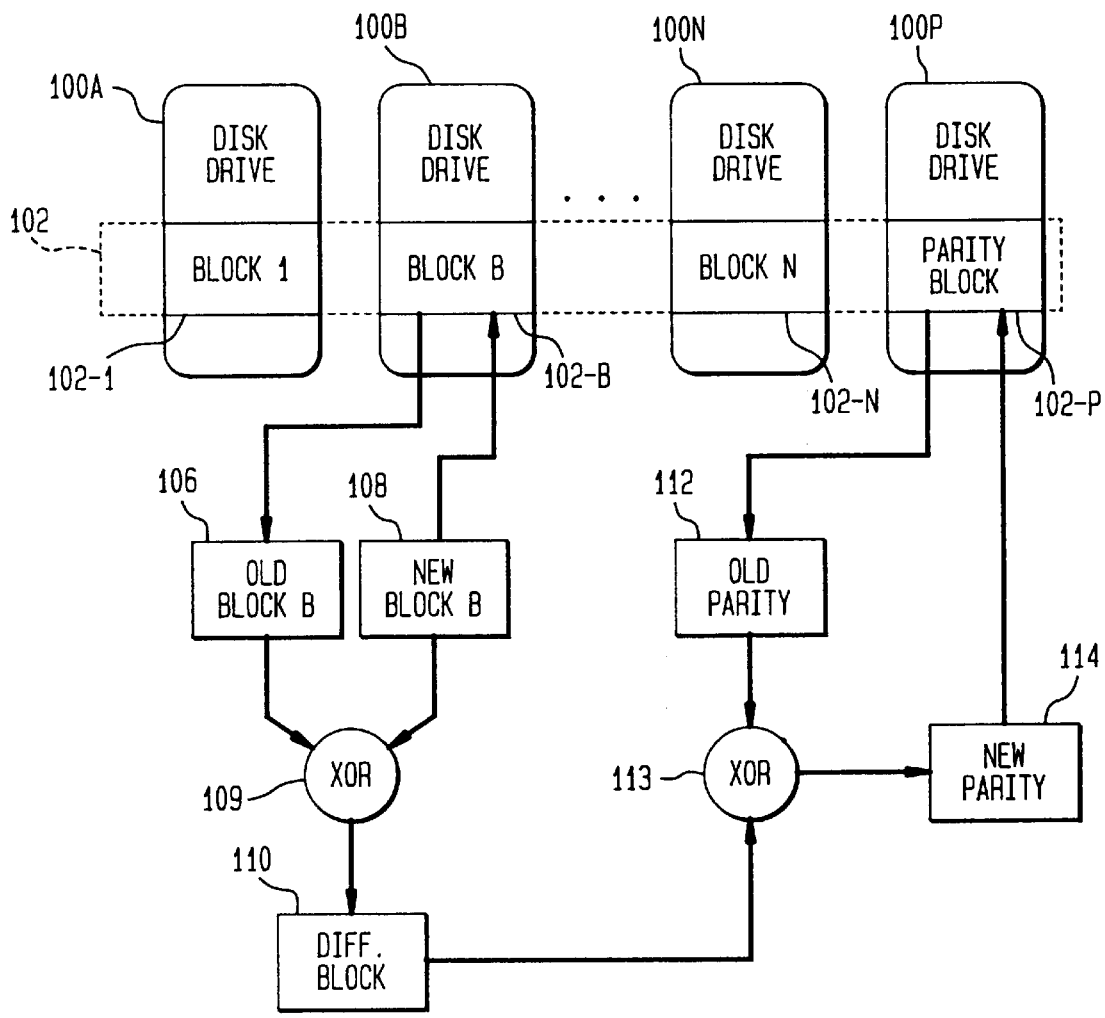
FIG. 2 is a data flow diagram of an update to a parity block, in the array of FIG. 1.

In order to update the parity block when a small update occurs, two block reads and two block writes are required, as shown in FIG. 2. In order to update block B 102-B, the old contents of block B 106 are read (first read). The new contents of block B 108 are written to block B 102-B (first write) and are bitwise exclusive-ORed 109 (XOR) with old block B 106. The result of the XOR is difference block 110. The old contents of the parity block 112 are read (second read) and are bitwise XOR'd 113 with difference block 110 to form new contents of the parity block 114. The new contents of the parity block 114 are then written into parity block 102-P (second write). Thus, two block read, two block write and two block XOR operations must be performed just to update the contents of one data block. By contrast, a non-RAID storage system would require just one block write to update block B.

A standard RAID-5 system can recover the contents of a failed data block as long as the contents of the data blocks in a stripe are kept consistent with the contents of the parity block. Ensuring this consistency causes the poor performance of standard RAID-5 for small updates. The scheme proposed by Savage and Wilkes permits temporary inconsistency and will lose data in those stripes that are inconsistent when failure occurs. Savage and Wilkes simply write each block update to disk as needed, but defer the parity update until the storage array is idle. They use a bit vector to indicate which stripes are dirty, that is, in need of a parity update. The storage array updates those stripes that are indicated as dirty during its idle periods.

Figure 3:
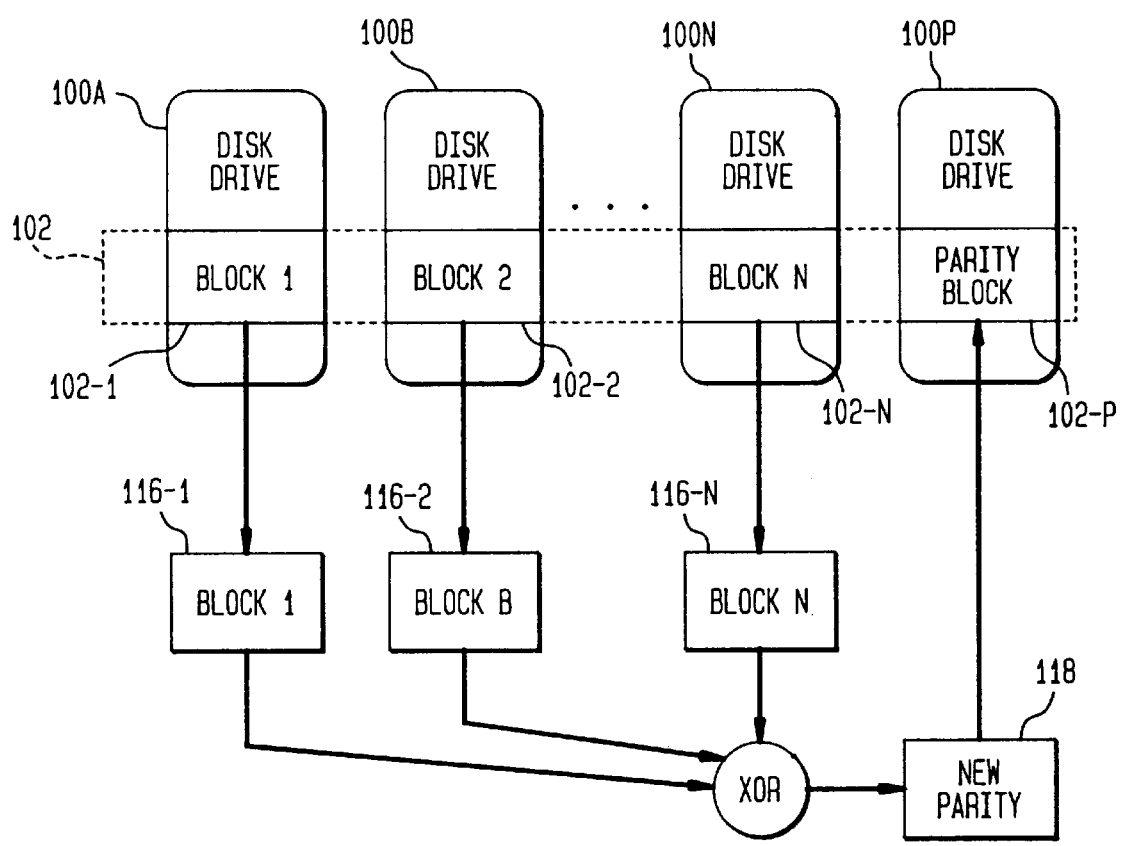
FIG. 3 is a data flow diagram of a cleaning update operation.

Cleaning a stripe means updating its parity block so that it is consistent with the other blocks in the stripe. The cleaning update operation is shown in FIG. 3. Each block in the stripe to be cleaned, except for the parity block, is read into memory and all the collected blocks are bitwise XOR'd. The result of the XOR operation becomes the new parity block. As shown in FIG. 3, the blocks in stripe 102, blocks 102-1 to 102-N, but not including parity block 102-P, are read into memory as blocks 116-1 to 116-N. The collected blocks are bitwise XOR'd as shown. The resulting new parity block 118 is then written to disk, becoming parity block 102-P.

Figure 4:
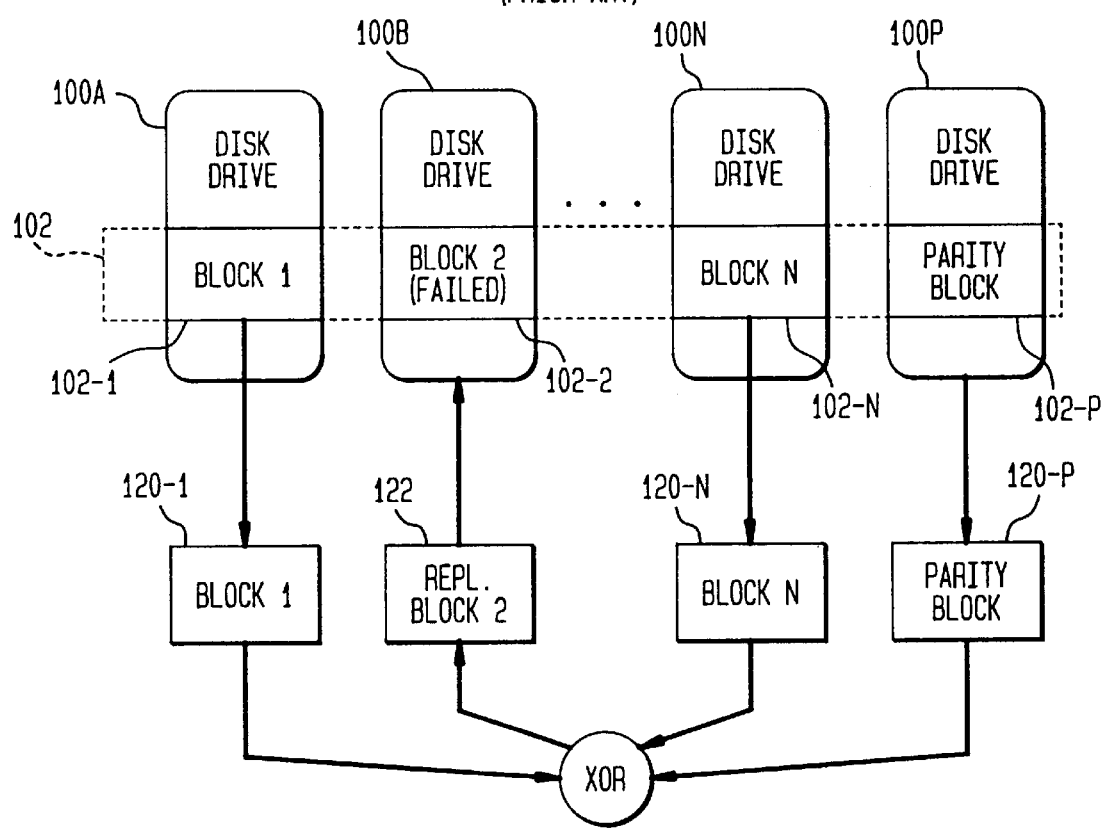
FIG. 4 is a data flow diagram of a parity rebuild operation.

Recovering a clean stripe from the failure of one of its blocks is termed the parity rebuild operation, and is shown in FIG. 4. Each functioning block in the stripe to be rebuilt, including the parity block, if it is functioning, is read into memory and all the collected blocks are bitwise XOR'd. The result of the XOR operation becomes the replacement for the failed-block. As shown in FIG. 4, block 2 102-2 of stripe 102 has failed. The blocks in stripe 102, blocks 102-1 to 102-N and 102-P, but not including failed block 102-2, are read into memory as blocks 120-1 to 120-N and 120-P. The collected blocks are bitwise XOR'd as shown. The resulting replacement block 2 122 is then written to disk, becoming replacement block 102-2. If block 102-2 failed because disk drive 100B failed, replacement block 102-2 is written to the disk drive that replaced disk drive 100B. If block 102-2 failed because the data area on disk drive 100B that was storing block 102-2 failed, then replacement block 102-2 is written back to the original drive 100B, but to a data area which replaces the failed data area.

Figure 5A:
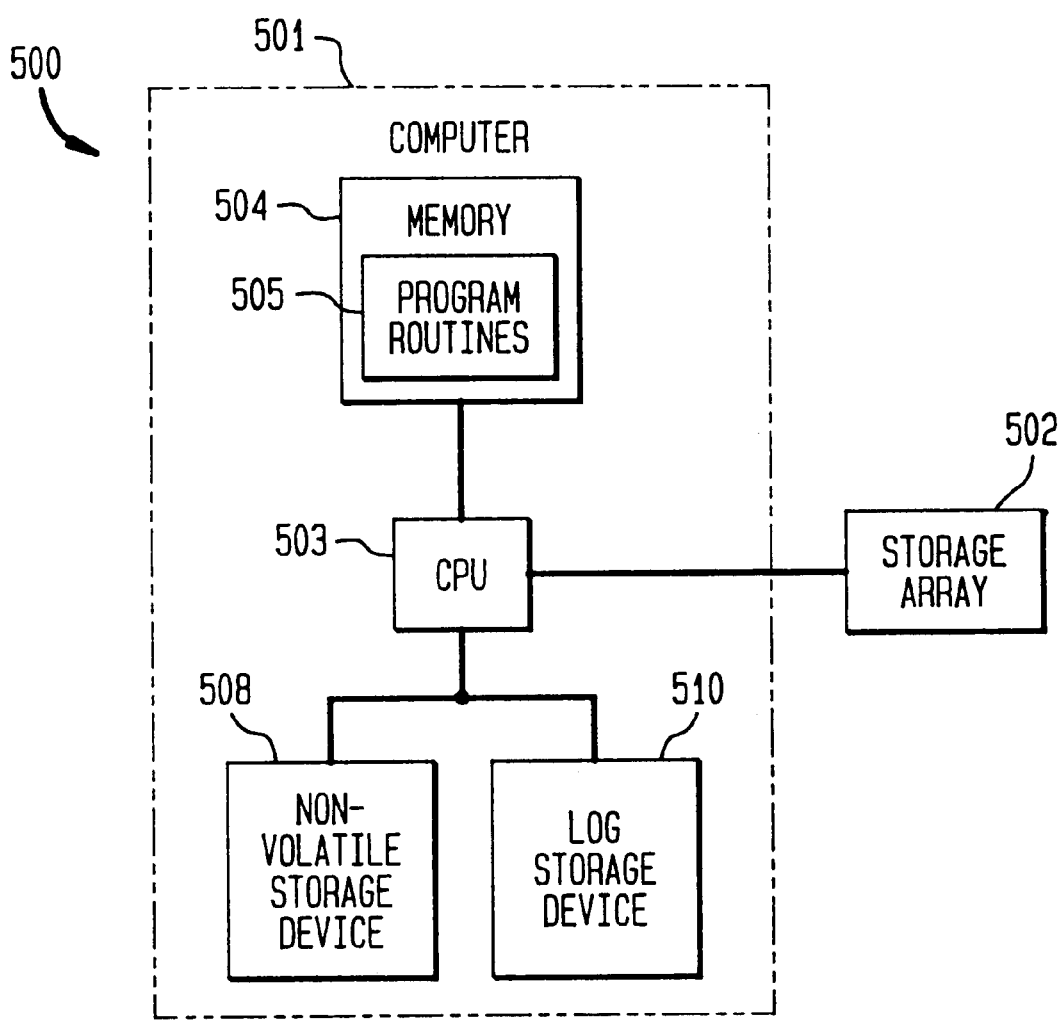
FIG. 5a is a block diagram of a storage system, in accordance with the present invention.

The present invention provides improved performance and reliability. The present invention uses logged information to determine how to make a stripe consistent with its parity block. An exemplary storage system 500, according to the present invention, is shown in FIG. 5a. Storage system 500 includes computer system 501 and storage array 502. Computer system 501 includes central processing unit (CPU) 503, which is connected to memory 504, which includes program routines 505, non-volatile storage device 508, and log storage device 510. CPU 503 typically includes a microprocessor, for example, an INTEL PENTIUM processor, but may include a higher performance processor, such as is found in a mini-computer or mainframe computer, or in a multi-processor system. Memory 504 stores program routines 505 that are executed by CPU 503 and data that is used during program execution. The execution of program routines 505 by CPU 503 implements the functions that are necessary to carry out the present invention. Memory 504 may include semiconductor devices, such as random-access memory, read-only memory, erasable read-only memory, electrically erasable read-only memory, etc., magnetic devices, such as floppy disk drives, hard disk drives, tape drives, etc. and optical devices, such as compact disk memory, digital versatile disk memory, etc.

Non-volatile storage device 508 stores information that is used in the present invention, which must survive system failures or power-downs. Storage device 508 could also be volatile storage, perhaps battery backed-up, at some reduction in reliability. Log storage device 510 stores logged information that is used in the present invention, such as logged images of data blocks. Although shown in FIG. 5a as separate blocks, storage device 508 and storage device 510 are not required to be separate devices. The information contained in these devices may be stored in the same device.

In the embodiment shown in FIG. 5a, a processor executing program routines implements the functions necessary to carry out the present invention. However, other embodiments are possible. For example, a special purpose logic circuit, in which the functions necessary to carry out the present invention have been implemented in logic, could be used instead. In this embodiment, the functions performed by CPU 503 and program routines 505 would be performed instead by the special-purpose logic circuit. This logic circuit could be implemented using application-specific integrated circuits (ASIC), such as custom integrated circuits (IC), semi-custom ICs, or gate-arrays, etc., programmable devices, such as field-programmable gate-arrays or programmable logic devices, etc., standard integrated circuits, or discrete components.

Figure 5B:
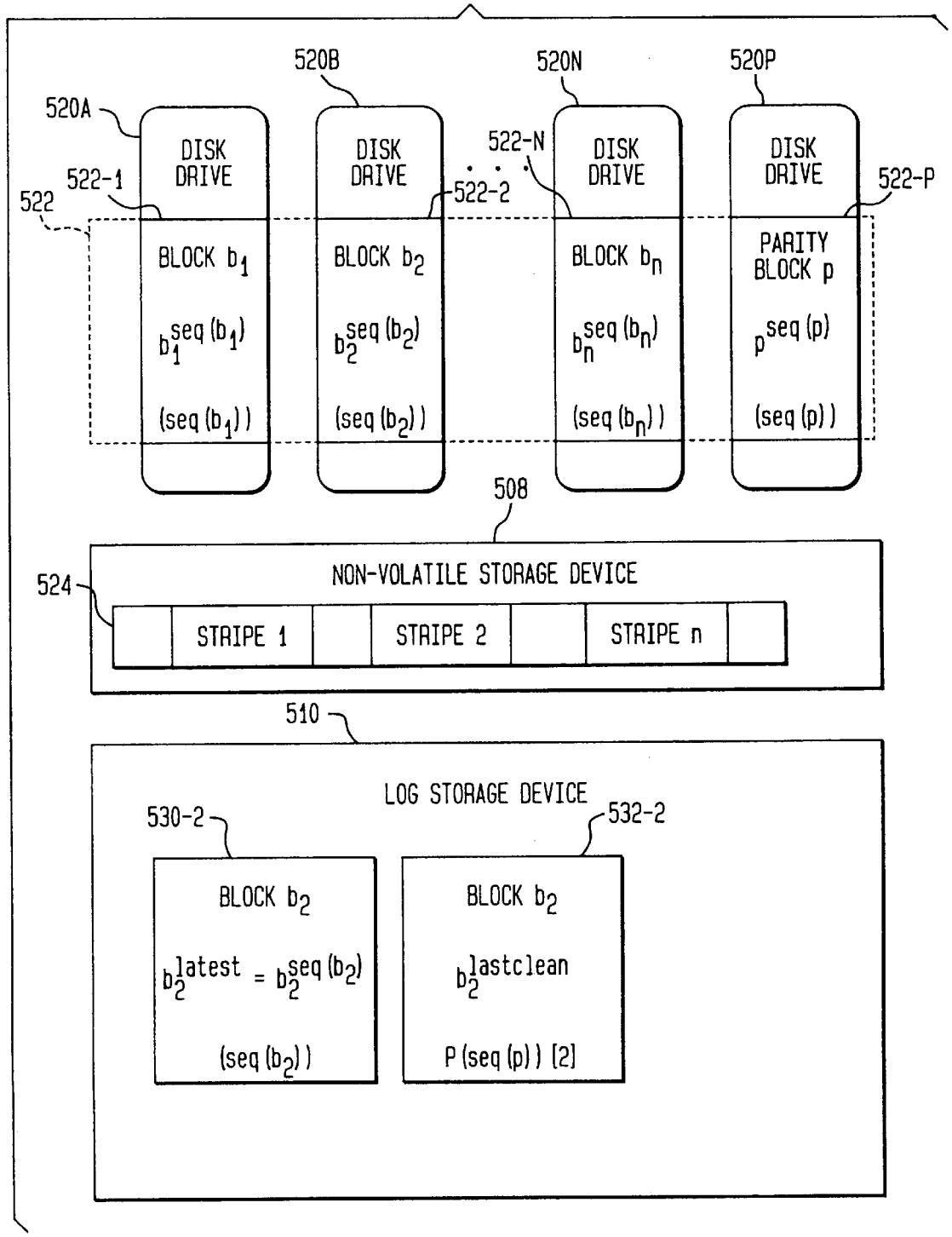

A more detailed block diagram of the system of FIG. 5a is shown in FIG. 5b. The storage array includes a plurality of disk drives, such as disk drives 520A to 520N and 520P. A stripe s 522 consists of data blocks $b_1, \ldots b_n$ 522-1 to 522-N and parity block p 522-P. A data block denoted $b_i$ will be used as an exemplary data block, which may represent any data block $b_1, \ldots b_n$ 522-1 to 522-N. Associated with each data block $b_i$ of stripe s is a sequence number, denoted seq($b_i$), which is the number of write operations that have been performed on $b_i$ since the storage array was activated. For example, the sequence number of block $b_1$ 522-1 is seq($b_1$) and, similarly, the sequence number of parity block p 522-P is seq(p).

The image of the kth write to block $b_i$ is denoted $b_i^k$. Likewise, $p^k$ is the kth image written to the parity block. Therefore, $b_i^{seq(b_i)}$ is the current contents of block $b_i$ and $p^{seq(p)}$ is the current contents of the parity block. For example, the current contents of block $b_1$ 522-1 is $b_1^{seq(b_1)}$ and the current contents of parity block p 522-P is $p^{seq(p)}$.

A parity-consistent image of stripe s, for a parity block $p^k$, is a vector including the sequence numbers of the blocks in the stripe at the time parity block p was written for the kth time. As described above, a parity block is generated by bitwise exclusive-ORing the data blocks of the stripe. Thus, a parity-consistent image is simply a list of the sequence numbers of the blocks that were used to generate a parity block. A parity-consistent image of the parity block $p^k$ is denoted P(k) and P(k)=$(k_1, \ldots, k_n)$ such that $p^k$ was computed from $b_1^{k_1} \oplus \ldots \oplus b_n^{k_n}$, where $\oplus$ denotes the bitwise exclusive-OR operation. The ith element of P(k) is denoted by P(k)[i].

Although the parity-consistent image is useful in understanding the processing that is performed by the present invention, it is not necessary to actually generate a parity-consistent image. Instead, the mechanism used by the present invention is a dirty stripe bit vector. A dirty stripe bit vector 524 is a vector in which each bit corresponds to a data stripe. Each bit has two states which represent the state of the parity block of the corresponding data stripe. One state indicates that the parity block is clean, that is, consistent with the data blocks in the data stripe. The other state indicates that the parity block is dirty, that is, not consistent with the data blocks in the data stripe. Other equivalent mechanisms may also be used to represent the same information.

The dirty stripe bit vector is updated for a stripe at the time the parity block for the stripe is updated. The dirty stripe bit vector is stored in non-volatile storage device 508, which is a separate device from disk drives 520A to 520N and 520P. Storage device 508 will typically be a non-volatile storage device, that is, the data in storage device 508 should not be lost even if there is a system failure.

A block $b_i$ is clean if it has not been written to since the parity block was updated. When a parity block p is updated, it acquires a sequence number seq(p), and is denoted $p^{seq(p)}$. The sequence number that block $b_i$ had when the parity block p acquired sequence number seq(p) is the ith element of the parity-consistent image P for the current parity block $p^{seq(p)}$. This is denoted P(seq(p))[i]. Thus, a block $b_i$ is clean if seq($b_i$)=P(seq(p))[i]. In other words, if the sequence number of block $b_i$ (the number of times the block has been written to) is the same as the sequence number that the block had when the current parity block was generated, the block is clean.

A block $b_i$ is dirty if it has been written to since the parity block was updated. This is formalized as seq($b_i$)>P(seq(p))[i]. Note that the alternative seq($b_i$)<P(seq(p))[i] cannot occur because the parity block is updated after the data blocks.

The value of the block $b_i$ that was most recently written is denoted $b_i^{latest}$ and, by definition, $b_i^{latest}=b_i^{seq(b_i)}$. The block $b_i^{latest}$ is logged to log storage device 510 whenever a block is updated. If a particular block is updated more than once, the new block value $b_i^{latest}$ may replace the previously logged block value. For example, in FIG. 5a, block $b_2$ has been updated, so block $b_2^{latest}$ 530-2 has been logged to log storage device 510.

The value of $b_i$ in the current parity-consistent image of s is denoted $b_i^{lastclean}$ and, by definition, $b_i^{lastclean}=b_i^{P(seq(p)[i])}$. Recall that the block $b_i$ is cleaned when the parity block is updated to include seq($b_i$) as the ith component of the dirty stripe bit vector. The block $b_i^{lastclean}$ is logged when an update is made to the clean block $b_i$. For example, in FIG. 5a, clean block $b_2$ has been logged to log storage device 510 to form log block 532-2, which contains $b_2^{lastclean}$, which is the value of block $b_2$ in the current dirty stripe bit vector of s, and has a sequence number of P(seq(p))[2]. Log storage device 510 may be either a volatile storage device, such as a memory buffer or a non-volatile storage device, such as a disk drive or array. It may be the same device as non-volatile storage device 508, or it may be a separate device.

A stripe s is clean if every block in the stripe is clean. Otherwise, s is dirty. When an update occurs that makes a stripe s dirty, the bit corresponding to stripe s in the dirty stripe bit vector is set to indicate that the stripe is dirty.

A block updating process, according to the present invention, is shown in FIG. 5c. The process begins with step 540, in which an update of a block $b_i$ is received. In step 542, if block $b_i$ is clean, that is, the sequence number of $b_i$ is the same as in the parity-consistent image of s, then the process ensures that the contents of block $b_i$ are logged to the log storage device. This is accomplished by determining whether the contents of block $b_i^{latest}$ are already present on the log storage device and, if not, logging block $b_i$ to the log storage device. The parity-consistent value of block $b_i$ is denoted $b_i^{lastclean}$. If block $b_i$ is not clean, then $b_i^{lastclean}$ already exists on the log, as it was logged when the update to the clean block $b_i$ was made. In step 544, the process ensures that the received update of block $b_i$ is logged to the log storage device, then it writes the received update of block $b_i$ to block $b_i$ in the storage array. Thus, after the write, both $b_i^{latest}$ and $b_i^{lastclean}$ will be on one or more logs.

A log-assisted rebuild process, according to the present invention, in which a stripe s is rebuilt after a disk failure, is shown in FIG. 5d. The process begins with step 550, in which a disk failure occurs. In step 552, it is determined whether the disk failure occurred in the parity block of the stripe s being processed. If so, the process continues with step 553, in which the cleaning update process, as shown in FIG. 3, is performed to generate a replacement parity block. If not, the process continues with step 554, in which it is determined whether the stripe is clean. This is done by accessing the dirty stripe bit vector and examining the bit corresponding to stripe s. If the stripe is clean, the process continues with step 566, in which the parity rebuild process is performed.

If the stripe is not clean, the process continues with step 556, in which a value, E, is formed, which is the exclusive-OR of all $b_i^{lastclean}$ with all $b_i^{latest}$ for all dirty blocks $b_i$ in stripe s. For example, if there are three dirty blocks, 1, 3, and 4, then E is formed from:

$$(b_1^{lastclean}) \oplus (b_3^{lastclean}) \oplus b_3^{latest}) \oplus (b_4^{lastclean} \oplus b_4^{latest}).$$

In step 558, the existing parity block p is read from the storage array. In step 560, the parity block p is bitwise exclusive-ORed with the value E to form a new parity block $p_{new}$. In step 562, the new parity block $p_{new}$ is written back to the storage array. In step 564, the logged blocks for stripe s are discarded and the dirty stripe bit vector is updated to indicate that stripe s is clean. In step 566, a replacement for the failed block is generated using the parity rebuild process shown in FIG. 4.

If a disk failure occurs while a write is occurring to another disk, the present invention completes the disk write before dealing with the disk failure. Thus, this event is treated as though the disk write took place before the disk failure. If a disk failure occurs while a write is occurring to the same disk, the present invention treats the event as though the write had never begun.

If a block $b_i$ in stripe s is written to while the parity block p for that stripe is being updated, the parity update is completed before the write occurs. Thus, the written image of block $b_i$ is the latest write $b_i^{latest}$ and the image when the parity block was updated is $b_i^{lastclean}$.

A stripe is considered clean only after the parity of the stripe has been updated. In general, status updates, such as marking a stripe as clean, must occur only after the underlying disk update has completed. If the updated disk fails after the disk update has completed, but before the status has been updated, a potential status mismatch may occur. However, when a disk fails, the status for that disk is discarded; thus, any potential status mismatch has no effect.

If the parity block of a stripe is updated but a disk fails before the dirty stripe bit vector is updated, the process may be unable to determine which blocks are dirty. Therefore, until the parity write is acknowledged, the disk writes for that stripe are retained in memory. If a disk fails before some writes are acknowledged, then those writes may be repeated from memory.

The present invention requires that every write to a data disk in the storage array be logged to some other non-volatile storage device. Many database systems implement well-known multi-version read consistency. Such systems already store before-images of at least most writes. In addition, many systems store after images of writes. For small updates, the present invention requires that all after images be stored, adding a little overhead. However, for updates that change one or more entire stripes, the present invention does not require the log.

Typically, the major additional overhead required by the present invention is that before-images that represent $b_i^{lastclean}$ may need to be maintained longer than they would for the purposes of multi-version read consistency. In the present invention, before-images must be maintained as long as they represent a value of $b_i^{lastclean}$. Thus, each before-image must be stored for as long as it is needed either for multi-version read consistency or for disk failure recovery. After-images must be stored for as long as they represent a value of $b_i^{latest}$. However, this generally creates no additional overhead, because typical database systems store afterimages longer than they are needed for disk recovery purposes.

In order to ensure that both $b_i^{lastclean}$ and $b_i^{latest}$ are available for every dirty block, it may be necessary to pre-read those blocks that would otherwise be written blindly (i.e. writing to a disk block without having read its contents). If the value $b_i^{lastclean}$ of already exists in the log due to previous activity, such as a previous write to block $b_i$, then the pre-read need not occur. Blind writes typically occur due to insert operations; updates and deletes are not normally done blindly.

Unusual failure combinations, such as a simultaneous disk and memory failure, are handled by restoring from backups.

Although a specific embodiment of the present invention has been described, it will be understood by those of skill in the art that there are other embodiments that are equivalent to the described embodiment. Accordingly, it is to be understood that the invention is not to be limited by the specific illustrated embodiment, but only by the scope of the appended claims.

What is claimed is:

1. A method of operating a storage system comprising a processor coupled to at least two data storage devices having at least one data stripe having at least one data block and a parity block, wherein said at least one data block and said parity block are stored on different said at least two data storage devices, the method comprising the steps of:
    performing a cleaning update on a data stripe of said at least one data stripe to verify that each data block in the data stripe is a last clean data block;
    receiving an updated data block for a data block in the data stripe;
    storing an image of the last clean data block corresponding to the updated data block;
    storing an image of the updated data block;
    replacing the data block with the updated data block;
    detecting a failed one of said at least two data storage devices;
    performing a generating step if the data stripe on the failed one of said at least two data storage devices stores one of said at least one data block, wherein the generating step computes an intermediate result by generating a bitwise exclusive-OR of the image of the updated data block and the image of the last clean data block;
    reading the parity block in the data stripe;
    generating a bitwise exclusive-OR of the intermediate result and the parity block to form a new parity block;
    replacing the parity block with the new parity block; and
    performing a parity rebuild on the data stripe with the new parity block.

2. The method of claim 1, wherein the step of performing a parity rebuild comprises the steps of:
    reading said at least one data block and said new parity block in the data stripe, wherein said reading does not occur on the failed one of said at least two data storage devices;
    generating a bitwise exclusive-OR of said at least one data block and said new parity block from the reading step to form a replacement data block; and
    writing the replacement data block to the data stripe on the failed one of said at least two data storage devices.

3. The method of claim 1, further comprising the step of:
    performing a cleaning update on the data stripe if the data stripe on the failed one of said at least two data storage devices stores a parity block.

4. The method of claim 3, wherein the step of performing a cleaning update comprises the steps of:
    reading said at least one data block in the data stripe;
    generating a bitwise exclusive-OR of said at least one data block from the reading step to form a new parity block; and
    writing the new parity block to the data stripe on the failed one of said at least two data storage devices.

5. A storage system comprising:
    a processor; and
    a storage array comprising at least two data storage devices coupled to the processor, wherein said at least two data storage devices have at least one data stripe having at least one data block and a parity block, and wherein said at least one data block and said parity block are stored on different said at least two data storage devices;
    wherein the storage system is operable to:
        perform a cleaning update on a data stripe of said at least one data stripe to verify that each data block in the data stripe is a last clean data block;
        receive an updated data block for a data block in the data stripe;
        store an image of the last clean data block corresponding to the updated data block;
        store an image of the updated data block;
        replace the data block with the updated data block;
        detect a failed one of said at least two data storage devices;

perform a generating step if the data stripe on the failed one of said at least two data storage devices stores one of said at least one data block, wherein the generating step computes an intermediate result by generating a bitwise exclusive-OR of the image of the updated data block and the image of the last clean data block;

read the parity block in the data stripe;

generate a bitwise exclusive-OR of the intermediate result and the parity block to form a new parity block;

replace the parity block with the new parity block; and perform a parity rebuild on the data stripe with the new parity block.

6. The storage system of claim 5, wherein the storage system is further operable to perform a parity rebuild by:

reading said at least one data block and said new parity block in the data stripe, wherein said reading does not occur on the failed one of said at least two data storage devices;

generating a bitwise exclusive-OR of said at least one data block and said new parity block from the reading step to form a replacement data block; and writing the replacement data block to the data stripe on the failed one of said at least two data storage devices.

7. The storage system of claim 5, further operable to perform a cleaning update on the data stripe if the data stripe on the failed one of said at least two data storage devices stores a parity block.

8. The storage system of claim 7, wherein the storage system is further operable to perform a cleaning update by:

reading said at least one data block in the data stripe;

generating a bitwise exclusive-OR of said at least one data block from the reading step to form a new parity block; and writing the new parity block to the data stripe on the failed one of said at least two data storage devices.

9. A storage system comprising:

a storage array comprising at least two data storage devices, wherein said at least two data storage devices are operable to store at least one data stripe having at least one data block and a parity block, and wherein said at least one data block and said parity block are stored on different said at least two data storage devices;

means for performing a cleaning update on a data stripe of said at least one data stripe to verify that each data block in the data stripe is a last clean data block;

means for receiving an updated data block for a data block in the data stripe;

means for storing an image of the last clean data block corresponding to the updated data block;

means for storing an image of the updated data block;

means for replacing the data block with the updated data block;

means for detecting a failed one of said at least two data storage devices;

means for performing a generating step if the data stripe on the failed one of said at least two data storage devices stores one of said at least one data block, wherein the generating step computes an intermediate result by generating a bitwise exclusive-OR of the image of the updated data block and the image of the last clean data block;

means for reading the parity block in the data stripe;

means for generating a bitwise exclusive-OR of the intermediate result and the parity block to form a new parity block;

means for replacing the parity block with the new parity block; and means for performing a parity rebuild on the data stripe with the new parity block.

10. The storage system of claim 9, wherein the means for performing a parity rebuild comprises:

means for reading said at least one data block and said new parity block in the data stripe, wherein said reading does not occur on the failed one of said at least two data storage devices;

means for generating a bitwise exclusive-OR of said at least one data block and said new parity block from the reading step to form a replacement data block; and means for writing the replacement data block to the data stripe on the failed one of said at least two data storage devices.

11. The storage system of claim 9, further comprising:

means for performing a cleaning update on the data stripe if the data stripe on the failed one of said at least two data storage devices stores a parity block.

12. The storage system of claim 9, wherein the means for performing a c leaning update comprises:

means for reading said at least one data block in the data stripe;

means for generating a bitwise exclusive-OR of said at least one data block from the reading step to form a new parity block; and means for writing the new parity block to the data stripe on the failed one of said at least two data storage devices.

* * * * *